Sept. 23, 1952 C. B. YODER 2,611,568
HOSE END HOLDER
Filed May 24, 1950
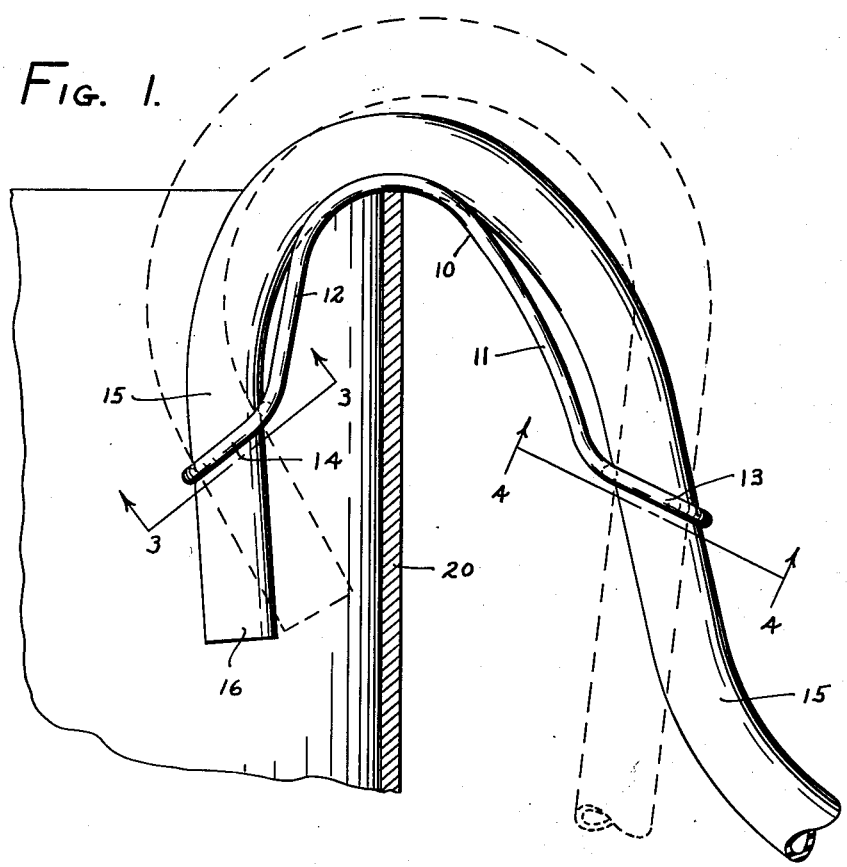
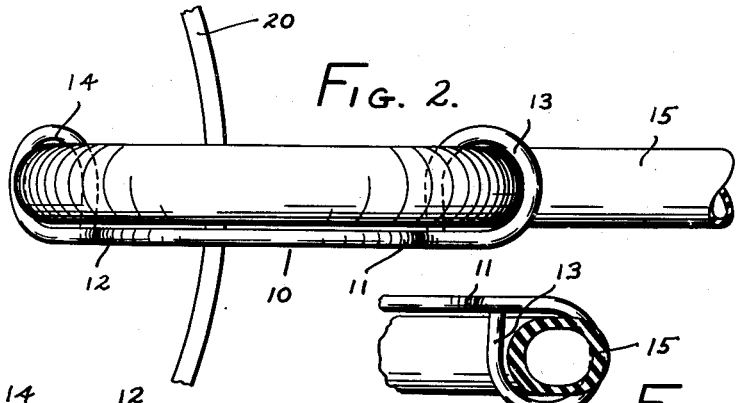
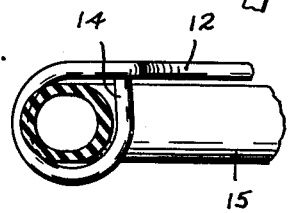
INVENTOR,
CLARENCE B. YODER,
BY Herbert A. Nienteren
ATTORNEY.

Patented Sept. 23, 1952

2,611,568

UNITED STATES PATENT OFFICE 2,611,568

HOSE END HOLDER

Clarence B. Yoder, Indianapolis, Ind.

Application May 24, 1950, Serial No. 163,967

2 Claims. (Cl. 248—79)

This invention relates to a device for holding a resilient rubber hose in a flexed condition over an edge of a container so that while fluid is flowing through the hose into the container, the hose will be held in a hooked over manner. One particular advantageous use of the device is to secure a water hose over the top edge of a clothes washing machine.

A primary object of this invention is to provide such a device which has no moving parts and is extremely simple and inexpensive to manufacture and highly efficient in operation.

Further objects and advantages of the invention will become apparent to those skilled in the art from the following description of one particular form of the invention as illustrated in the accompanying drawing, in which Fig. 1 is a view in side elevation of a device embodying the invention positioned over the side of a container and holding a resilient rubber hose;

Fig. 2 is a top plan view;

Fig. 3 is a view in section on the line 3—3 in Fig. 1; and

Fig. 4 is a view in section on the line 4—4 in Fig. 1.

Like reference characters refer to like parts throughout the several views.

The device is formed from a single length of wire which preferably has a circular cross section to have an inverted approximately U-shaped body generally designated by the numeral 10. The body 10 has outwardly diverging legs 11 and 12. In the form shown, the leg 12 is shorter than the leg 11.

The leg 11 has an integral end portion extending obliquely downwardly and outwardly therefrom bent around on itself to form an eye 13 which is substantially circular and of an internal diameter at least equal to that of a hose 15. This eye 13 is offset to one side of the plane of the body 10.

The leg 12 has an end portion bent around on itself to form an eye 14 extending obliquely downwardly and outwardly therefrom. This eye 14 is substantially circular, the same size as the eye 13 on the leg 11, and is offset from the plane of the body 10 on the same side as the eye 13.

The central plane of the eye 13 and the central plane of the eye 14 are oppositely inclined toward each other, each at an angle of approximately 45 degrees with the horizontal. This angle may be increased to secure a tighter grip on the hose to be held or decreased if a looser grip is desired.

To use the hose holder, the usual resilient hose 15 is threaded by its discharge end 16 upwardly through the eye 13 and then curved around on itself and threaded downwardly through the eye 14 to assume some such position as shown by the broken lines in Fig. 1. The hose 15 is then pulled downwardly through the eye 13, thus cocking the hose in the circular openings in the eyes 13 and 14.

The openings in the eyes 13 and 14 are formed to have a greater diameter than the largest size hose which is to be used with the holder. Therefore when the hose is threaded through the eyes 13 and 14 with its axis at right angles to the plane through the eye it can pass freely therethrough, but when the hose is cocked in the eye openings, the hose is compressively biased against front and rear edges of the openings. The hose is thus frictionally engaged in the opening and held securely in position against longitudinal displacement.

The device and the hose 15 are then placed on the upper edge of a container 20 with the discharge end 16 of the hose inside of the container, with the body 10 bearing on the edge to carry the load of the hose 15.

While I have herein shown my invention in one particular form, it is obvious that changes in the structure can be made without departing from the spirit of my invention, and I therefore do not desire to be limited beyond the scope of the following claims.

I claim:

1. A device for holding a resilient hose over an edge of a container comprising a one piece, inverted, generally U-shaped wire with downwardly extending legs, each leg terminated in a lower end portion turned laterally outwardly around from and back toward the leg into an approximately circular shape to define a loop forming an eye of a size to receive loosely therethrough a hose, each of said loops lying in a plane inclined upwardly toward its leg from a lower downmost loop side, said planes being oppositely inclined to have said downmost side below the juncture of the loop with its leg.

2. A device for holding a resilient hose over an edge of a container comprising a one piece, inverted, generally U-shaped wire with downwardly extending legs, each leg terminated in a lower end portion turned laterally outwardly around from and back toward the leg into an approximately circular shape to define a loop forming an eye of a size to receive loosely therethrough a hose, each of said loops lying in a plane inclined upwardly toward its leg from a lower downmost loop side, said planes being oppositely inclined to have said downmost side below the juncture of the loop with its leg; said loops being on one common side of a plane including the axis of the wire through the U bend.

CLARENCE B. YODER.

REFERENCES CITED

The following references are of record in the file of this patent:

UNITED STATES PATENTS

| Number | Name | Date |
|---|---|---|
| Re. 21,670 | Conklin | Dec. 24, 1940 |
| 682,269 | Poe | Sept. 10, 1901 |
| 1,933,919 | McPherson | Nov. 7, 1933 |